US007807116B2

(12) United States Patent
Gerlinger et al.

(10) Patent No.: US 7,807,116 B2
(45) Date of Patent: Oct. 5, 2010

(54) SHELL-AND-TUBE REACTOR INCLUDING A DISTRIBUTION DEVICE FOR A GAS-LIQUID PHASE MIXTURE

(75) Inventors: Wolfgang Gerlinger, Limburgerhof (DE); Torsten Mattke, Freinsheim (DE); Oliver Bey, Niederkirchen (DE)

(73) Assignee: BASF SE, Ludwigshafen (DE)

( * ) Notice: Subject to any disclaimer, the term of this patent is extended or adjusted under 35 U.S.C. 154(b) by 282 days.

(21) Appl. No.: 12/090,152

(22) PCT Filed: Oct. 18, 2006

(86) PCT No.: PCT/EP2006/067531

§ 371 (c)(1),
(2), (4) Date: Apr. 14, 2008

(87) PCT Pub. No.: WO2007/045666

PCT Pub. Date: Apr. 26, 2007

(65) Prior Publication Data

US 2008/0241021 A1    Oct. 2, 2008

(30) Foreign Application Priority Data

Oct. 20, 2005  (DE) .................. 10 2005 050 283

(51) Int. Cl.
*B01J 10/00* (2006.01)
(52) U.S. Cl. .............. 422/197; 422/201; 422/139; 422/140; 422/141; 422/143; 422/191; 422/211; 422/213; 422/216; 422/220; 422/311; 261/96
(58) Field of Classification Search ......... 422/197, 422/140, 141, 143, 191, 211, 213, 216, 220, 422/311, 201; 261/96
See application file for complete search history.

(56) References Cited

U.S. PATENT DOCUMENTS

| 3,197,286 | A |   | 7/1965  | Karkas et al.                   |
|-----------|---|---|---------|---------------------------------|
| 3,524,731 | A | * | 8/1970  | Effron et al. ............ 422/220 |
| 4,427,053 | A | * | 1/1984  | Klaren ............... 165/104.16 |
| 4,707,340 | A | * | 11/1987 | Milligan ............... 422/140 |
| 5,545,382 | A | * | 8/1996  | Sechrist ............... 422/216 |
| 6,029,956 | A |   | 2/2000  | McGrath                          |
| 6,093,373 | A | * | 7/2000  | Darmancier et al. ...... 422/220 |
| 2003/0223924 | A1 |   | 12/2003 | Bachtel et al.              |

FOREIGN PATENT DOCUMENTS

GB   2148141      5/1985
WO   WO-00/61706 A1   10/2000

* cited by examiner

*Primary Examiner*—Walter D Griffin
*Assistant Examiner*—Huy-Tram Nguyen
(74) *Attorney, Agent, or Firm*—Connolly Bove Lodge & Hutz LLP

(57) ABSTRACT

A shell-and-tube reactor is disclosed. Contact tubes are disposed within a cylindrical housing and are secured to tube plates. Gas and liquid phases are received via a feed opening in a lower end cap and discharged via an upper end cap in the housing. A distributor device is disposed in the housing, such that the tube plates serve as a horizontal plate for the distributor device to back up the gas phase and form a gas cushion, and vertical elements extend from the contact tubes. The vertical elements are adapted to conduct the liquid phase, are open in the upstream direction, and project outward in the direction of the feed opening through the gas cushion. The vertical elements further include at least one first opening on the circumference for the gas phase and at least one second opening for the liquid phase.

7 Claims, 3 Drawing Sheets

SHELL-AND-TUBE REACTOR INCLUDING A DISTRIBUTION DEVICE FOR A GAS-LIQUID PHASE MIXTURE

Priority is claimed as a national stage application under 35 U.S.C. §371 to PCT/EP2006/067531, filed Oct. 18, 2006, which claims priority to German application 10 2005 050 283.0, filed Oct. 20, 2005. The aforementioned priority documents are incorporated herein by reference as if set forth in full.

The invention relates to a distributor device for a gas phase/liquid phase mixture for apparatuses for uniformly distributing a gas phase and a liquid phase over the cross section of the apparatus.

In chemical processes it is frequently necessary to introduce a gas phase and a liquid phase, in particular in the form of a gas phase/liquid phase mixture, into an apparatus via at least one feed opening whose hydraulic diameter can be smaller than the hydraulic diameter of the apparatus. The hydraulic diameter ratios and the associated flow conditions and also the prevailing density difference between gas phase and liquid phase result, in particular, in a nonuniform distribution of the gas phase over the cross section of the apparatus. This leads to problems, especially when a continuous fixed bed is located in the apparatus or when contact tubes filled with solid particles, for example catalysts, or gaps between heat-exchange plates are present. However, some flow conditions can also lead to a degree of separation of liquid and gas phase even in the feed line or to nonuniform inflow of gas and liquid phase, which make it necessary to make the inflow stream more uniform.

Furthermore, the introduction of a two-phase mixture and uniform distribution of this over the cross section of the apparatus have been found to be problematical since a change in the gas-liquid distribution or in the component composition in the two phases results in an additional degree of freedom in the two-phase mixture. Thus, a nonuniform distribution of the phases can lead to a shift in the equilibrium and thus to a local change in the component composition of the individual phases. For example, vaporization of a component from the liquid phase can occur in the marginal regions which are reached only unsatisfactorily by the gas phase, so that the liquid phase is depleted in this component.

Apparatuses for chemical reactions into which a gas phase and a liquid phase are introduced have, inter alia, a central, cylindrical or prismatic part in which the chemical reaction takes place. If appropriate, the chemical reaction is catalyzed, with a continuous fixed bed, contact tubes filled with catalysts or catalyst particles or heat-exchange plates with gaps between them being provided in the apparatus. The apparatus is closed at the two ends by lids or end plates which are, for example, flat or curved, in the form of dished ends, vault-shaped ends or parts of a sphere.

In the region of a lower end plate, a gas phase and a liquid phase are introduced into the apparatus via at least one feed opening of a feed device. When jet gas phase/liquid phase mixture enters the interior of the apparatus through the feed opening, formation of large gas bubbles or a gas jet can occur as a result of a coalescence of the gas phase and these rise centrally and possibly impinge on the surface of a fixed bed or a tube plate in which the contact tubes are arranged. In contrast thereto, the gas phase reaches the outer regions of the apparatus only unsatisfactorily, causing a locally nonuniform distribution. Under some circumstances, a phase transition of one or more components additionally takes place so that a locally changed equilibrium occurs. This causes nonuniformity in the reaction conditions in the apparatus, as a result of which the chemical reaction does not proceed optimally. However, a nonuniform distribution of the two phases can occur even in the feed line. Furthermore, gas bubbles of different sizes lead to an undesirable nonuniform distribution of the two phases over the cross section of the apparatus.

To make the distribution of the gas phase/liquid phase mixture more uniform and to avoid the problems described, it is necessary to use distributor devices in the region of the feed opening.

In the case of bubble columns in which a liquid phase is present, U.S. Pat. No. 6,029,956 discloses dispersing the introduced gas phase in the liquid phase at sintered plates or perforated plates. Here, the gas phase which rises more quickly forms a gas cushion below the internals, as a result of which the liquid phase flows past the sintered or perforated plate. At the plate, the gas phase disperses in the liquid phase through largely uniformly distributed through-openings. Application of this to a system in which a two-phase mixture is fed in results in the disadvantage that the separation of the two phases cannot be complete because of unknown separation and coalescence behavior and the prevailing flow conditions. In addition, a space has to be made available to the two phases upstream in the apparatus in order to ensure that the distribution is made uniform.

In contrast thereto there is a sieve plate which extends over the entire cross section of the apparatus and at which both the gas phase and the liquid phase are dispersed evenly over the cross section of the apparatus through identical openings in the sieve plate. Such a sieve plate produces a high pressure drop in the apparatus, as a result of which the operating costs are increased. Moreover, it has been found that a sieve plate is unsuitable for making a multiphase mixture more uniform. Use in apparatuses having a fixed bed makes it more difficult to obtain access to the fixed bed located behind it, which can, in particular, be necessary in order to replace the exhausted catalyst in the case of a fixed bed of catalyst.

Ring distributors which are accommodated in a tube plate and have a multiplicity of openings for making a distribution more uniform require a large installation volume since a plurality of rings having a large number of openings are necessary for a uniform distribution. A problem is found to be that uniform flow of the two-phase mixture has to be ensured within the ring distributor in order to avoid a shift in the gas-liquid distribution over the flow cross section.

In view of this, it was an object of the present invention to provide a distributor device for a gas phase and a liquid phase, for an apparatus in order to achieve a uniform distribution over the entire cross section of the apparatus, which is independent of their separation and coalescence behavior and the prevailing flow conditions. In particular, a uniform distribution over the entire cross section of the apparatus should be ensured at a constant composition of the phases, and the distributor device should be structurally simple and correspondingly inexpensive. The distributor device should be suitable for essentially all types of gas-liquid contact apparatuses, preferably for apparatuses in which a fixed bed is present, or shell-and-tube apparatuses having a plurality of contact tubes which are welded into tube plates and filled with catalyst particles. It should also be suitable for apparatuses with heat-exchange plates arranged therein with gaps between the heat-exchange plates which are filled with a particulate heterogeneous catalyst.

This object is achieved by a distributor device for a gas phase/liquid phase mixture for an apparatus into whose interior a gas phase and a liquid phase are introduced via at least one feed opening, wherein the distributor device comprises a horizontal plate at which the ascending gas phase backs up to form a gas cushion and vertical elements which conduct the liquid phase and are arranged on the plate and are open in the upstream direction and project outward in the direction of the feed opening through the gas cushion formed into the liquid phase, with at least one opening for the gas phase being provided on the circumference of the elements which conduct the liquid phase in the region of the gas cushion formed.

Apparatuses in which the distributor device of the invention is used are, in particular, ones in which a fixed bed is located, for example on a support grating or in a shell-and-tube apparatus in which a plurality of contact tubes are welded into tube plates and the gas phase/liquid phase mixture is fed via a feed opening in an end cap, passed, for example, through the contact tubes and taken off from the apparatus via the other end cap.

The distributor device of the invention can also be used, for example, in a flow line which branches upstream, in which case it should be ensured that the same gas phase/liquid phase mixture flows into the plurality of flow lines.

The nonuniform distribution of a gas and a liquid phase occurring hitherto is caused, inter alia, by the hydraulic diameter of the feed opening being many times smaller than the hydraulic diameter of the apparatus. The term "hydraulic diameter" refers in hydrodynamics to the ratio of four times the area to the circumference of an opening. Owing to the density difference between gas phase and liquid phase, the gas bubbles of a two-phase mixture rise more rapidly or coalescence behavior and/or flow conditions at the feed opening or in the feed line can lead to formation of large gas bubbles or a gas jet so that the gas phase rises largely centrally at a high velocity.

A distributor device according to the invention utilizes the separation of the gas phase and the liquid phase at the distributor device caused by the density differences and flow conditions. The distributor device comprises a horizontal plate which can, for example, be configured as a plate extending over the entire cross section of the apparatus. The gas phase backs up at this horizontal plate to form a gas cushion. Vertical elements which conduct the liquid phase are arranged on the horizontal plate, for example in the form of tubes which extend downward in the direction of the feed opening and have an opening in the upstream direction. The length of the tubes is chosen so that it exceeds the height of the gas cushion formed and the tubes thus extend through the backed-up gas cushion into the liquid.

A further embodiment provides a one-piece distributor device, for example one made of a metal sheet. Here, a horizontal plate and the vertical elements which conduct the liquid phase are obtained from an appropriately shaped three-dimensional structure of a metal sheet.

Each vertical element which conducts the liquid phase preferably has a peripheral opening through which the liquid phase can flow in its lower region. The bottom end of each vertical element which conducts the liquid phase can preferably be configured so that the gas phase ascending from the feed opening of the apparatus in the form of gas bubbles or gas jets cannot flow directly into the interior.

The gas phase which backs up to form a gas cushion preferably travels through at least one opening on the circumference of the individual vertical elements which conduct the liquid phase at the height of the gas cushion formed into the liquid phase stream present in the interior. As a result, a common flow path is available for the liquid phase and the gas phase in the interior of the elements which conduct the liquid phase. After initial separation of gas phase and liquid phase, the two phases are as a result brought into contact with one another in such a way that a uniform distribution can be established. A multiplicity of such vertical elements which conduct the liquid phase and are distributed uniformly over the cross section of the apparatus and makes openings for two-phase flow available in the upstream direction ensures a more uniform distribution of the gas phase/liquid phase mixture over the cross section of the apparatus.

One embodiment of the distributor device comprises a horizontal plate into which a multiplicity of tubes are inserted, welded or otherwise attached. The tubes extend downward in the direction of the feed opening and have a closed bottom end, so that direct inflow of the gas phase is not possible. A covering of the bottom end can be configured, for example, as a cap, bubble cap or the like. Tubes which are located in a peripheral region of the apparatus and are thus largely not in the ascending gas bubbles flow toward them can be configured without a covering, thus saving space. The covering can be made oblique so that catalyst particles falling down from a catalyst bed located above can be discharged from the tube without causing blockage of an opening.

The height of the gas cushion formed is a function of the prevailing pressure drop of the gas flow through the distributor plate, the pressure drop of the liquid phase and the hydrostatic pressure difference between gas and liquid. Depending on the density difference between gas and liquid phase, gas volume flow or type of loading, a height of the gas cushion which can vary greatly is established. The tubes are preferably provided with a plurality of openings for the gas phase which are located vertically beneath one another and through which, depending on the height of the gas cushion, the gas phase or the liquid phase flows.

The openings located vertically beneath one another which are provided for the gas phase can, in particular, have different diameters. They are preferably in the range from 1 mm to 10 mm.

The tubes which provide the common flow path for liquid phase and gas phase can have different diameters.

A distributor device according to the invention is preferably used in an apparatus configured as a shell-and-tube reactor. In such an apparatus, contact tubes are welded into at least one tube plate and comprise a catalyst bed. To ensure, by means of the distributor device of the invention, that the same amount of gas phase/liquid phase mixture flows into the individual contact tubes, each tubular element which conducts the liquid phase on the distributor device is assigned to at least one contact tube. The gas phase/liquid phase mixture flowing through the tube of the distributor device can preferably supply a plurality of contact tubes. Here, a plurality of holes or vertical rows of holes for the flow of gas phase are provided on the circumference of an individual element which conducts the liquid phase, preferably arranged so that the ascending gas bubbles can travel essentially directly into the interior of the plurality of associated contact tubes. The diameter of the elements which conduct the liquid phase can be different depending on whether they are assigned to one or more contact tubes. In a central region of the apparatus, one element which conducts the liquid phase on the distributor device can preferably supply three contact tubes. In the peripheral regions of the apparatus, an element which conducts the liquid phase can be assigned to two or even one contact tube, with the diameter of the elements which conduct the liquid phase preferably decreasing toward the peripheral region.

To obtain a height of the gas cushion formed which is as constant as possible over the cross section of the apparatus, the horizontal plate of the distributor device is if possible aligned horizontally in the apparatus. The horizontal plate is preferably fastened to a tube plate of the apparatus by means of spacers. A retention screen of any fixed bed present can advantageously likewise be fixed by means of the spacers.

In a preferred embodiment of the distributor device, in which an element which conducts the liquid phase on the distributor device is assigned to a plurality of contact tubes, a spacing between plate and tube plate in the order of the diameter of the contact tubes is provided in order to keep any pressure drop caused by deflection as small as possible.

A further preferred embodiment of the distributor device utilizes the lower tube plate of the apparatus configured as a shell-and-tube reactor as horizontal plate of the distributor device at which the separation of gas phase and liquid phase is effected. The vertical elements which conduct the liquid phase on the distributor device, which are appropriately provided with openings for the liquid phase and the gas phase, are preferably configured as tubes which can be plugged into the contact tubes welded into the tube plate and thus represent an extension of the latter. Each plugged-in tube can comprise a retention screen which supports the catalyst particles.

A further preferred embodiment of the distributor device is made of a metal sheet. Here, the openings for the flow of liquid phase and the at least one opening for the gas phase per flow path are produced in a metal sheet. The resulting metal sheet is subsequently folded a number of times in strips, so that a three-dimensional structure is formed. This has the at least one opening for the gas phase in its vertical sections and at least one peripheral opening for the liquid phase on its vertically lower end. Upper horizontal sections of the three-dimensional structure provide an area for a spacer by means of which a connection to a tube plate of the apparatus can be produced. Lower horizontal sections close the distributor apparatus off from ascending gas bubbles or an ascending gas jet. The folded metal sheet is subsequently provided with an outer boundary, for example in the form of a welded-on margin.

It should be ensured that the gas cushion formed at the distributor device is uniform in the strip-like, vertical elements which conduct the liquid phase. For example, the strips can be bounded laterally by providing them with openings for the gas phase, so that equilibration of the gas cushion formed per vertical element which conducts the liquid phase over the space between the lateral boundary and the outer boundary can occur. As an alternative, a predistributor can be arranged beneath the distributor device in an offset manner so that equilibration of the gas cushion takes place.

Comprehensive studies have found that the problem of nonuniformity in the distribution of a gas phase/liquid phase mixture over the cross section of an apparatus can be solved in a simple fashion by the above-defined distributor devices, as a result of which nonuniformities over the cross section of the apparatus both in respect of the gas phase and in respect of the composition of the phases are avoided.

The invention is illustrated below with the aid of the drawing.

Figure 1:
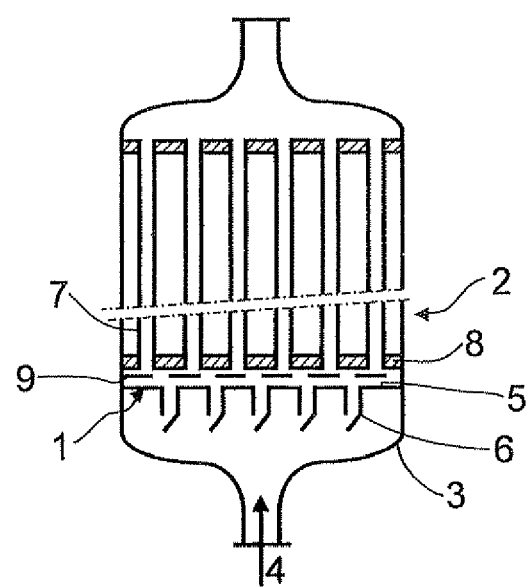
FIG. 1 shows a longitudinal section through an apparatus configured as a shell-and-tube reactor with a distributor device according to the invention in the lower end cap.

The longitudinal section in FIG. 1 shows an apparatus 2 having a central cylindrical part which is closed off at both ends by a hemispherical end cap 3. A gas phase/liquid phase mixture is introduced into the lower end cap 3 of the apparatus 2 via an inlet opening 4 which, in the embodiment shown in FIG. 1, is, for example, located centrally in the lower end cap 3 and is uniformly distributed by means of a distributor device 1. The distributor device 1 comprises a horizontal plate 5 and a multiplicity of elements 6 which conduct the liquid phase and extend in the direction of the feed opening 4 and can, for example, be configured as tubes.

In FIG. 1, the apparatus 2 is configured as a shell-and-tube reactor having a central cylindrical part in which the contact tubes 7 are arranged in tube plates 8. Below the lower tube plate 8 there is, for example, a support grating 9. The distributor device 1 is arranged in the apparatus 2 so that there is a spacing between the horizontal plate 5 and the lower tube plate 8, in particular if an element 6 which conducts the liquid phase is assigned to a plurality of contact tubes 7.

Figure 2:
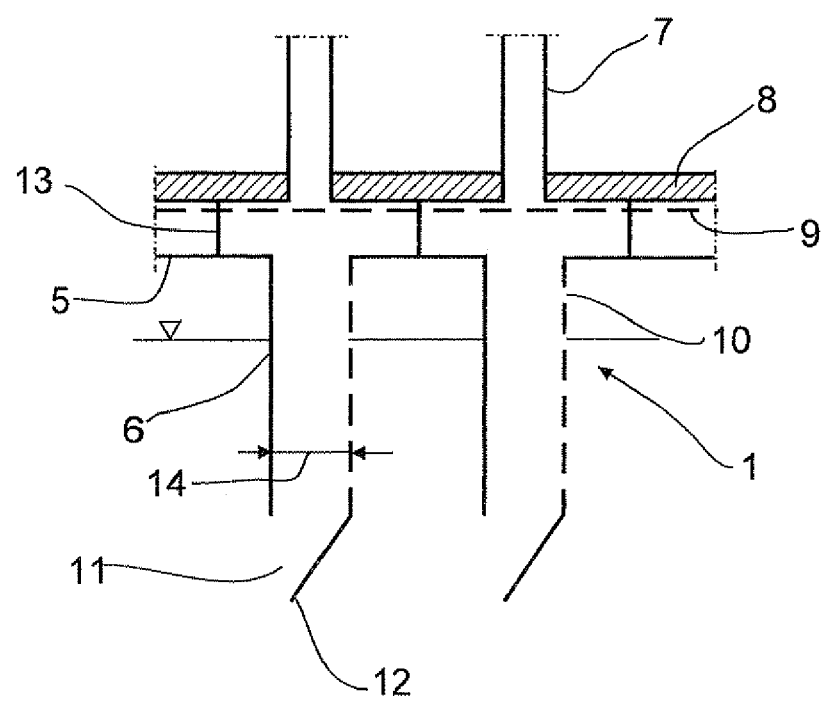
FIG. 2 shows a detail of the distributor device of FIG. 1.

FIG. 2 shows a detail of the distributor device of FIG. 1. The distributor device 1 comprises a horizontal plate 5 into which downward-extending elements 6 which conduct the liquid phase are inserted or welded. In the vertical direction, openings 10 are arranged above one another on each element 6 which conducts the liquid phase. The gas phase which has backed up to form a gas cushion beneath the horizontal plate 5 preferably disperses through these openings 10. In addition, each element 6 which conducts the liquid phase comprises an opening 11 through which the liquid phase flows at a bottom end 12. Depending on the type of loading, a different height of the backed-up gas cushion is obtained underneath the horizontal plate 5. Accordingly, the gas phase flows through one or more openings 10 of the element 6 which conducts the liquid phase, as a result of which the liquid phase can travel both through the opening 11 and correspondingly through one or more openings 10.

The bottom end 12 of each element 6 which conducts the liquid phase can preferably be closed, so that the ascending gas phase does not directly enter the interior of the element 6 which conducts the liquid phase. A slanted cap which makes it possible for falling catalyst particles to be able to exit the element 6 which conducts the liquid phase without blocking openings 10, 11 can be provided in one embodiment for this purpose.

The horizontal plate 5 is fastened to the tube plate 8 by means of spacers 13, via which the support grating 9 can likewise be fixed.

Figure 3:
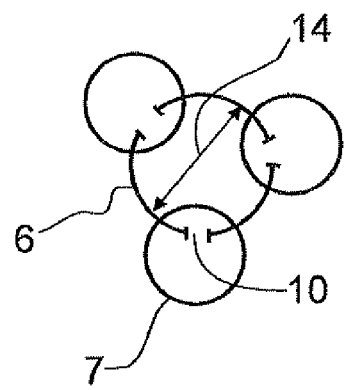
FIG. 3 shows a cross section through an apparatus configured as a shell-and-tube reactor with a distributor device located underneath.

FIG. 3 depicts a cross section of the distributor device 1 of FIG. 2. It can clearly been seen that an element 6 which conducts the liquid phase on the distributor device 1 can be assigned to a plurality of contact tubes 7. The diameter 14 of the elements 6 which conduct the liquid phase varies depending on whether the element 6 which conducts the liquid phase is in fluid-conducting contact with one or more contact tubes 7. A plurality of rows of openings 10 located vertically underneath one another can be provided on the circumference of each element 6 which conducts the liquid phase, so that the gas bubbles dispersed through a plurality of openings 10 into the liquid phase flow which prevails in the interior of each element 6 which conducts the liquid phase can advantageously travel upward into the respective contact tubes 7.

Figure 4:
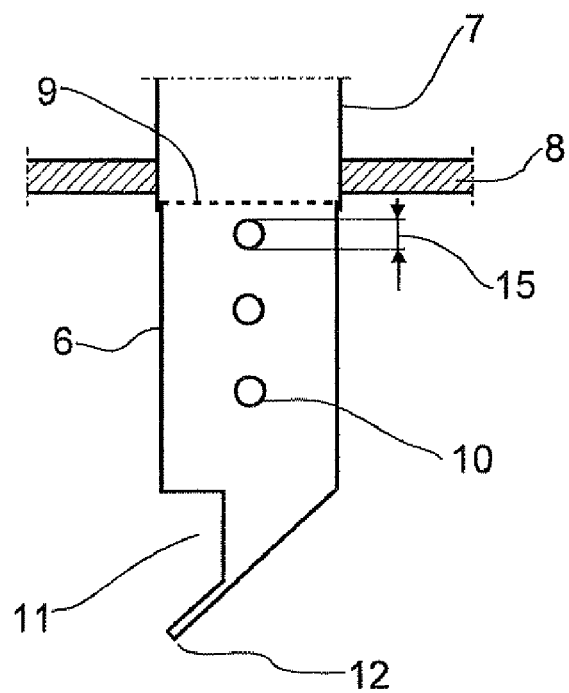
FIG. 4 shows a longitudinal section of a preferred embodiment of a distributor device.

FIG. 4 depicts an alternative embodiment of a distributor device 1 in which the tube plate 8 into which the contact tubes 7 of an apparatus 2 configured as a shell-and-tube reactor are welded, inserted or screwed functions as horizontal plate 5 at which the ascending gas phase is backed up to form a gas cushion. A tubular element 6 which conducts the liquid phase is assigned to each contact tube 7 and can be inserted or welded into the contact tube 7. In each element 6 which conducts the liquid phase there is a retention grating 9 on which the catalyst particles with which the contact tubes 7 are filled lie. Openings 10 through which the gas phase disperses are provided on the downward-extending section of an element 6 which conducts the liquid phase. The diameters 15 of the openings 10 located underneath one another can preferably be different; for example, they can decrease with increasing distance from the tube plate 8. An opening 11 for the liquid phase is provided at the bottom end 12 of each element 6 which conducts the liquid phase. The bottom end 12 is covered in a downward direction, preferably by means of an oblique cap which allows falling catalyst particles to be discharged toward the outside and not block openings 10, 11.

Figure 5:
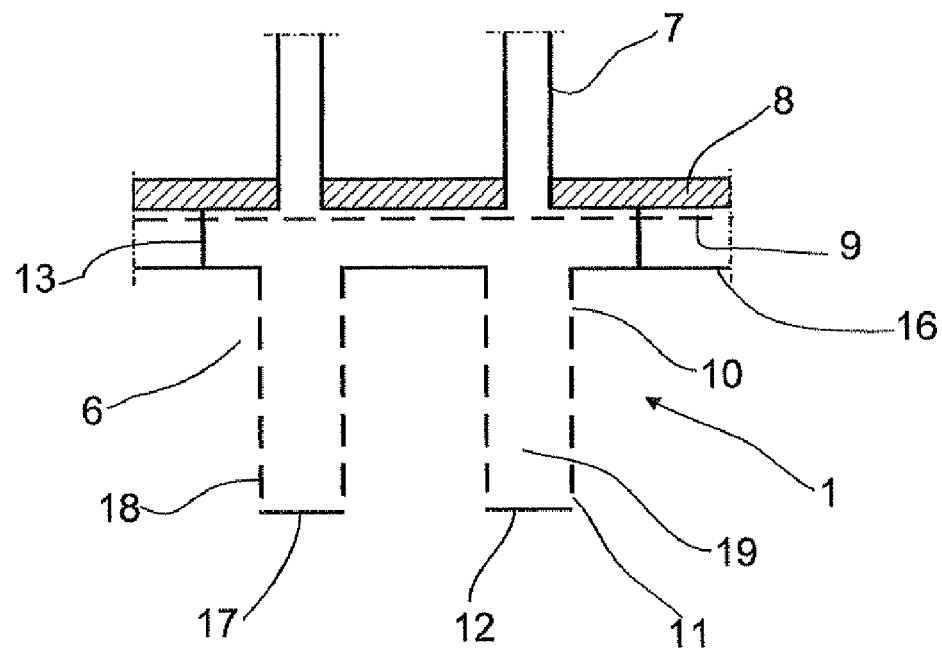
FIG. 5 shows an embodiment of a distributor device in longitudinal section.

FIG. 5 shows a further alternative embodiment of the distributor device 1. Starting from a metal sheet, a three-dimensional structure having the shape shown in FIG. 5 is produced by means of appropriate folds. The metal sheet is provided with openings 10 which are preferably configured as a row of a plurality of openings 10. In addition, at least one opening 11 for the flow of liquid phase is produced at a bottom end of the three-dimensional structure. Upper horizontal sections 16 and lower horizontal sections 17 with vertical sections 18, in which the openings 10 and the openings 11 are arranged, located between them are produced by folding. On the upper horizontal sections 16, spacers 13 can provide for assignment to and fixing to a tube plate 8. The lower horizontal sections 17 are preferably closed so that ascending gas bubbles cannot directly enter the space 19 between the vertical sections 18. The space 19 can be strip-like over the cross section of the apparatus.

Figure 6:
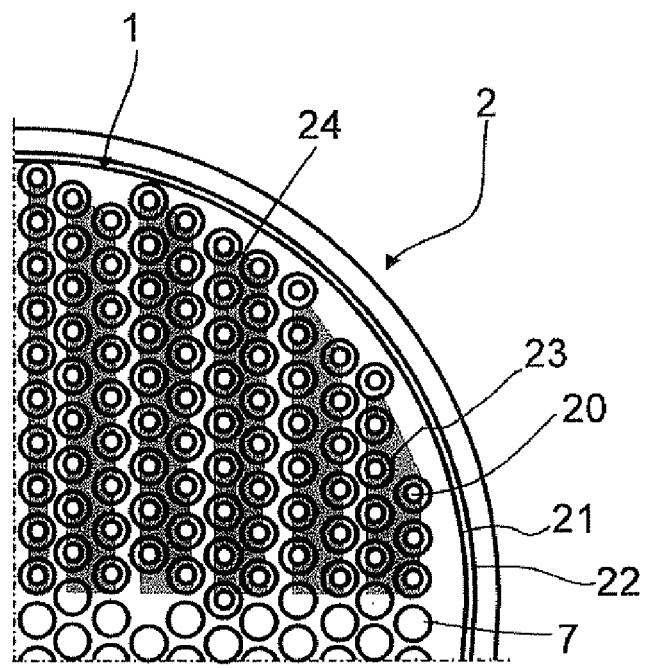
FIG. 6 shows a cross section of the embodiment of the distributor device of FIG. 5.

FIG. 6 shows a plan view of the embodiment of the distributor device 1 of FIG. 5. The rows of openings 10 and 11 arranged on the vertical sections 18 are each assigned to a contact tube 7, with 20 denoting the position of the rows of openings 10 and 11 which are assigned to the interior of a contact tube 7. The distributor device 1 covers almost the entire cross section of the apparatus 2. The distributor device 1 comprises an outer boundary 21 which is located close to the interior wall 22 of the apparatus 2. The space 19, which in plan view has a strip-like cross-sectional area 23, is closed off to the outer boundary 21 by means of lateral boundaries 24. The openings 10 and 11 for the gas phase or for the liquid phase which are assigned to the outermost contact tubes 7 of the apparatus 2 are advantageously located in these lateral boundaries 24. In addition, openings (not shown) which serve to make the gas cushion formed in the space 19 uniform are provided in the lateral boundaries 24.

The invention claimed is:

1. A shell-and-tube reactor comprising:
   a cylindrical housing closed off at lower and upper ends by lower and upper end caps, respectively;
   contact tubes disposed within the housing, the contact tubes being secured to tube plates, wherein the cylindrical housing and contact tubes are adapted to receive a gas phase and a liquid phase via at least one feed opening in the lower end cap, the gas and liquid phase being discharged via the upper end cap; and
   a distributor device comprising:
      a horizontal plate arranged to back up the gas phase to form a gas cushion; and
      vertical elements adapted to conduct the liquid phase, the vertical elements being arranged on the horizontal plate, open in the upstream direction, and project outward in the direction of the feed opening through the gas cushion, wherein at least one first opening is included on the circumference of the vertical elements for the gas phase and at least one second opening is included on the vertical elements for the liquid phase, and wherein the distributor device is further configured so that the horizontal plate serves as the tube plates and the vertical elements are configured as extensions of the contact tubes.

2. The shell-and-tube reactor of claim 1, wherein the each vertical element includes a plurality of additional openings arranged vertically underneath one another in one of a row or vertical slits for the gas phase.

3. The shell-and-tube reactor of claim 2, wherein the additional openings have different sizes.

4. The shell-and-tube reactor of claim 1, wherein the each vertical element includes a plurality of rows of openings arranged vertically underneath one another.

5. The shell-and-tube reactor of claim 1, wherein the vertical elements have different diameters.

6. The shell-and-tube reactor of claim 1, wherein each vertical elements are element is closed at a bottom end by a cap.

7. The shell-and-tube reactor of claim 6, wherein each cap which are slanted, hoods, bubble caps or other shapes.

* * * * *